(12) United States Patent
Llinares et al.

(10) Patent No.: US 11,731,259 B2
(45) Date of Patent: Aug. 22, 2023

(54) HOLDER FOR IMPLEMENTS AND METHOD FOR PRODUCING SUCH A HOLDER

(71) Applicant: 2L SOLUTIONS, Chauvigny (FR)

(72) Inventors: Oscar Llinares, Chauvigny (FR); Eric Llinares, Chauvigny (FR)

(73) Assignee: 2L SOLUTIONS, Chauvigny (FR)

( * ) Notice: Subject to any disclaimer, the term of this patent is extended or adjusted under 35 U.S.C. 154(b) by 512 days.

(21) Appl. No.: 16/629,470

(22) PCT Filed: Jun. 29, 2018

(86) PCT No.: PCT/EP2018/067513
§ 371 (c)(1),
(2) Date: Jan. 8, 2020

(87) PCT Pub. No.: WO2019/011665
PCT Pub. Date: Jan. 17, 2019

(65) Prior Publication Data
US 2020/0164501 A1    May 28, 2020

(30) Foreign Application Priority Data

Jul. 10, 2017 (FR) ........................................ 1756489

(51) Int. Cl.
*B25H 3/06* (2006.01)
*B29C 44/14* (2006.01)
(Continued)

(52) U.S. Cl.
CPC ............... *B25H 3/06* (2013.01); *B29C 44/14* (2013.01); *B25H 3/02* (2013.01); *B29K 2075/00* (2013.01); *B29K 2105/04* (2013.01)

(58) Field of Classification Search
CPC .......... B25H 3/00; B25H 3/003; B25H 3/006; B25H 3/06; B29K 2075/00; B29K 2075/02; B29C 33/56; B29C 33/565; B29C 37/0025; B29C 37/0032; B29C 37/0035; B29C 41/00; B29C 41/08; B29C 45/1619; B29C 48/151
See application file for complete search history.

(56) References Cited

U.S. PATENT DOCUMENTS 4,389,454 A * 6/1983 Horacek .................... C08J 9/34
428/318.6
5,725,096 A * 3/1998 Winnard ................ B25H 3/028
211/DIG. 1
(Continued)

FOREIGN PATENT DOCUMENTS

FR    2922802 A1    5/2009
GB    2463269 A    3/2010

OTHER PUBLICATIONS

Search Report from French Intellectual Property Office on corresponding FR application (FR1756489) dated Mar. 6, 2018.
(Continued)

*Primary Examiner* — Stella K Yi
(74) *Attorney, Agent, or Firm* — KOS IP Law LLP

(57) ABSTRACT

A support for an equipment, where the support comprises at least one reception imprint which is concave and designed to receive at least partially the equipment and at least one coating made of waterproof elastomer designed to come into contact with the equipment.

20 Claims, 2 Drawing Sheets

(51) Int. Cl.
  *B25H 3/02* (2006.01)
  *B29K 75/00* (2006.01)
  *B29K 105/04* (2006.01)

(56) References Cited

U.S. PATENT DOCUMENTS 6,189,635 B1 * 2/2001 Schuler .................. B60R 16/04
                                                180/68.5
2016/0129583 A1   5/2016 Young

OTHER PUBLICATIONS

International Search Report and Written Opinion on corresponding PCT application (PCT/EP2018/067513) from International Searching Authority (EPO) dated Sep. 17, 2018.

* cited by examiner

HOLDER FOR IMPLEMENTS AND METHOD FOR PRODUCING SUCH A HOLDER

TECHNICAL FIELD

The present invention concerns the field of the equipment support, and in particular of tools used by operators when installing an engine.

BACKGROUND

In a known manner, tools such as a clamp, pliers, a screwdriver and comparable items are stored in a toolbox. To determine whether tools are missing, it is common to have a tool support with imprints in which the tools can be kept. Thus, if an imprint is empty, it can be deduced that the tool is missing.

The tool support is traditionally made of polyethylene foam. Such a tool support tends to fragment over time, which deforms the imprints and increases the risk that pieces of foam are dispersed when using the tools. In addition, when a liquid is inadvertently poured on to the tool support, the liquid is absorbed by the foam, which contaminates it and damages it. Such disadvantages are critical when assembling an engine, in particular in the aeronautical field. Indeed, it is important that no foreign element is lost in the engine, to minimise the risk of the engine malfunctioning.

The aim of the invention is therefore to eliminate at least some of these disadvantages by providing a new equipment support. Although the invention originally came about to support a tool, it applies more generally to supports of all kinds of equipment.

SUMMARY OF THE INVENTION

The invention concerns a support for equipment, where the support comprises at least one reception imprint which is concave and configured to hold the equipment in place, at least partially.

The invention is remarkable in that the support comprises at least one waterproof elastomer coating designed to come into contact with the equipment.

By virtue of the invention, if a liquid is poured on to the support, the liquid is not absorbed by the support, preventing any premature damage. An elastomer also has satisfactory characteristics of resistance to chemical corrosion. Thus, if a chemical (kerosene or engine oil) is poured on to the coating, the latter can be cleaned such that it can be used once again without any impairment of performance.

The coating preferably comprises a blend of isocyanates and polyamines, and in particular of polyurea, i.e. an aliphatic or aromatic polyurea material. Such a coating has very satisfactory qualities of sealing and resistance to chemical corrosion. Polyurea is thus particularly advantageous. In addition, due to its flexibility and its elasticity, it resists tearing optimally, which is advantageous in order to support pointed or cutting equipment. It also has a very long lifetime. Finally, such a coating can be cleaned at high pressure, which is advantageous.

In a preferred manner, the coating consists of polyurea, which simplifies its manufacture.

In a preferred manner, the support comprises a main body covered with the said coating. This advantageously enables the coating, which is expensive, to be kept thin, and enables a main body to be used, which acts as a core, and which is inexpensive. The main body is preferably made of polyurethane.

According to one preferred aspect, the reception imprint is configured to cooperate by complementarity of shapes with at least a portion of the surface of the equipment. The equipment is thus supported in a stable manner, which minimises the risk of damaging the said equipment, particularly during transport. Such an imprint allows optimal protection, and provides a foolproofing means. The reception imprint is preferably designed to cooperate by complementarity of shapes with 40%-50% of the surface of the equipment, in order to enable an operator to remove or to return the equipment easily from or to its imprint.

In a preferred manner, the support comprises a plurality of reception imprints, in order that several identical or different equipments can be held in place.

According to one aspect of the invention, the outer surface of the coating is flat outside the reception imprint(s), to enable immediate visual identification of the positioning of the reception imprints in the support.

In a preferred manner, the colour of the coating outside the reception imprint(s) is different from the colour of the coating in the reception imprints(s). Thus, the presence of an equipment in the reception imprint is clearly identifiable by visual means, enabling loss of equipment to be prevented when installing an engine, for example. In a preferred manner, the imprints are coloured with a bright colour, while the outer surface is coloured with a dark colour, in order to detect by visual means the presence of a dark-coloured equipment in a reception imprint. Thus, an area of bright colour in the support indicates that an equipment is absent.

The invention also concerns the combination of a support as presented above, and of an equipment kept in the support's reception imprint.

The invention also concerns a method of manufacture of a support for equipment, as presented above, comprising a main body covered with a coating, where the method comprises:

a step of production of a mould defining at least partially the surface of the equipment, a step of deposition of a sealed elastomer material on the mould to form the coating of the support, and a step formation of the main body of the support on the coating.

Such a manufacturing method is simple to implement and thus enables small series of supports to be produced at low cost. It also enables an imprint to be formed which perfectly fits the shape of the equipment which it is designed to receive. The sealed elastomer material is preferably deposited by projection in order to fit the shape of the mould. The mould is preferably obtained by 3D computer scanning of an existing equipment.

BRIEF DESCRIPTION OF THE DRAWINGS

The invention will be better understood on reading the following description, given only as an example, which makes reference to the appended illustrations, in which.

It should be noted that the figures explain the invention in detail in order to implement the invention, and that the said figures can of course be used to improve the definition of the invention, if applicable.

DETAILED DESCRIPTION

A tool support according to an implementation of the invention will be described, but it is self-evident that the invention applies to supports of all kinds of equipment. For example, to install an aeronautical engine, an operator must use a large number of tools which are stored in a tool support.

Figure 1:
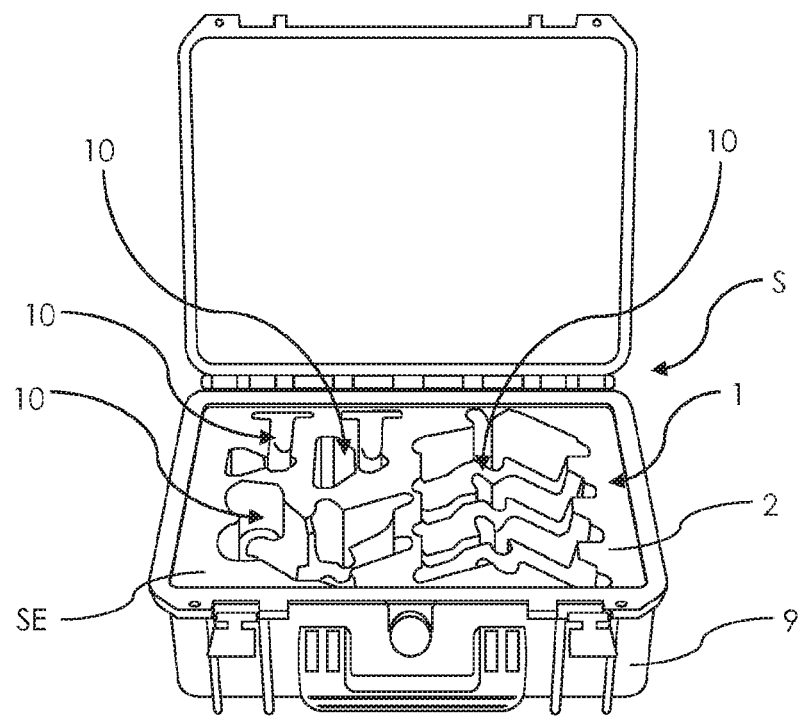
FIG. 1 is a representation of a tool case comprising a tool support according to an implementation of the invention.

With reference to FIG. 1, a case 9 is represented, in which a tool support S according to the invention is contained. As illustrated in FIG. 1, support S comprises a main body 3 which in this case is rectangular in shape, with rounded edges; however, it is self-evident that all shapes are possible (disk, etc.).

In this example, support S comprises a plurality of reception imprints 10 such that it can received a plurality of tools (not represented in FIG. 1). Each reception imprint 10 is concave and designed to hold in place at least a portion of the surfaces of the tools.

Figure 3:
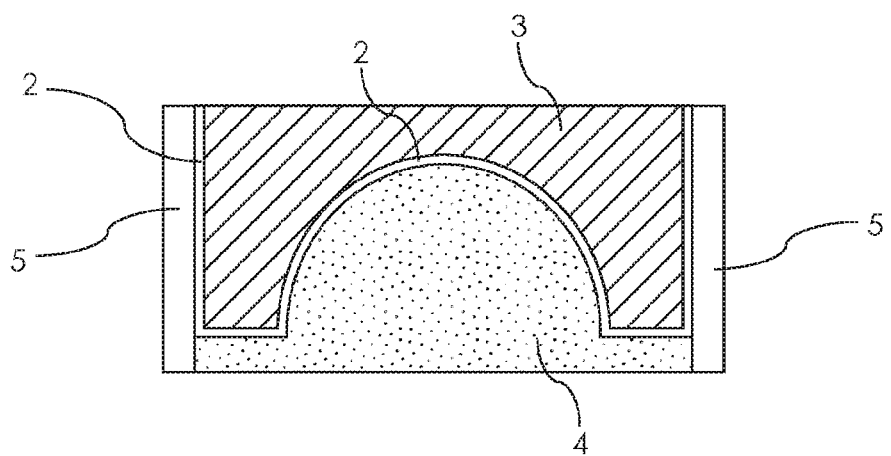
FIG. 2 is a diagrammatic representation of a method of production of a tool support according to an implementation of the invention and FIG. 3 is a cross-section view of a step of formation of the support.
Figure 2:
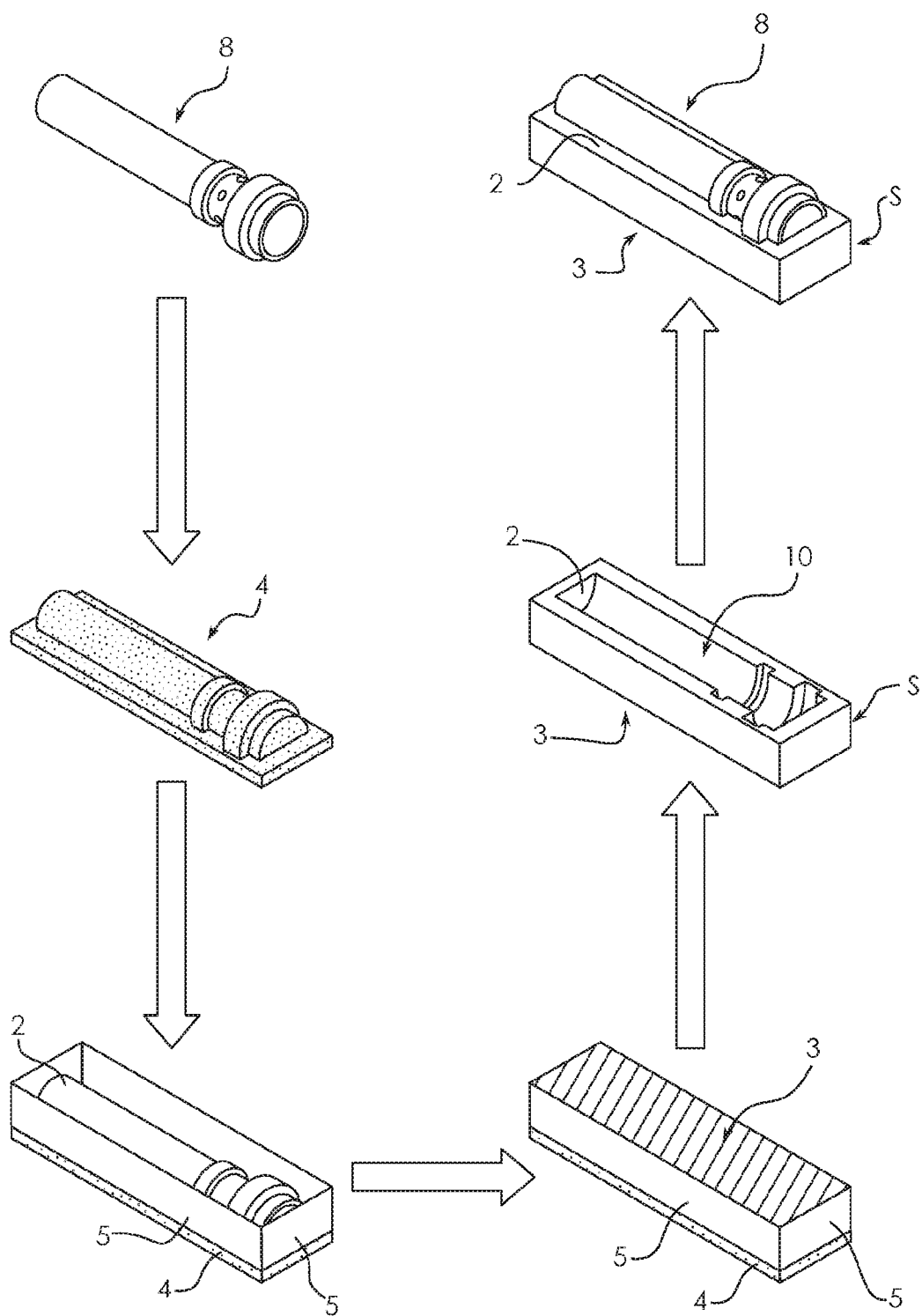

In this implementation, as illustrated in FIGS. 2 and 3, each reception imprint 10 is designed to cooperate by complementarity of shapes with at least a portion of the surface of a tool which is to be supported. Such a complementarity of shapes enables reception imprint 10 to fit partially the shape of the tool which is to be supported. In a preferred manner, reception imprint 10 is designed to cooperate by complementarity of shapes with 40%-50% of the surface of the tool, in order that it can support it sufficiently whilst facilitating its insertion into and removal from support S.

With reference to FIG. 1, outer surface SE of support S is flat outside reception imprints 10, which enables the encumbrance of support S to be minimised, and makes it easy to contain it in a case 9. This also enables an operator to identify by visual means whether a reception imprint 10 is empty.

In a preferred manner, the colour and outside surface SE of support S outside reception imprints 10 is different from the colour of reception imprints 10. Advantageously, reception imprints 10 are clearly identifiable by visual means, which facilitates detection of a missing tool by an operator. The colour of reception imprints 10 is preferably bright, and that of outer surface SE is dark, so as to draw attention to a reception imprint 10 which is empty. Indeed, since tools are generally dark-coloured, the outer visual appearance is dark overall, when all the tools are put in their respective reception imprints. A missing tool is easy to detect since it causes a bright area to be present in support S.

In accordance with the invention, main body 3 is covered with a coating 2 made of sealed elastomer comprising polyurea, i.e. an aliphatic or aromatic polyurea material. In a preferred manner, coating 2 consists of polyurea. In a known manner, the polyurea comprises a blend of isocyanates and of polyamines. It is self-evident that other sealed elastomers could be used.

Such a coating 2 enables the surface of support S to be made sealed, to prevent it absorbing liquids and becoming damaged. Coating 2 is also resistant to chemical attacks, and is not damaged when brought into contact with kerosene or oil. Finally, coating 2 has a flexibility and an elasticity which enable a tool to be held in place in a safe and stable manner, fitting its shape.

According to a preferred aspect, the polyurea comprises polyol, forming a hybrid polyurea of lesser cost.

Advantageously, coating 2 can be coloured in a practical manner, such that the colour of outer surface SE of support S outside reception imprints 10 is different to the colour of reception imprints 10. In a preferred manner, coating 2 is painted the desired colours, but it is self-evident that coating 2 could also be self-coloured. In this implementation coating 2 is between 0.5 mm and 8 mm thick, making a compromise between performance and cost.

An implementation of a method of manufacture of a support S according to the invention will now be described.

With reference to FIG. 2, the method comprises a step of production of a mould 4 defining at least partially the surface of an equipment 8. In this example, mould 4 is made from a digital model of equipment 8, where the digital model can be produced by a computer-assisted design application or obtained by computer scanning of an existing equipment 8, in particular by means of a 3D scanner.

In this example, positive mould 4 is made, and its shape is identical to that of equipment 8 which is to be supported. Mould 4 is preferably made from a machinable panel, in particular by machining.

The method also comprises a step of projection of a sealed elastomer material on to mould 4 to form coating 2 of support S. In this example, polyurea is projected on to mould 4 to form a sealed membrane fitting the shape of equipment 8. Coating 2 hardens rapidly and thus forms the base of mould 4. In a preferred manner, with reference to FIGS. 2 and 3, shuttering leaves 5 can be placed around mould 4 to minimise the spreading of the polyurea during projection.

With reference to FIG. 3, the method also comprises a step of formation of main body 3 on coating 2. In this example, main body 3 is made of a polyurethane foam which is injected on coating 2. In a preferred manner, a flexible polyurethane foam is used. This advantageously enables a main body 3 to be formed which adheres directly to coating 2. In addition, such a polyurethane foam has satisfactory chemical correspondence with polyurea. It is self-evident that main body 3, which is also called the core, could also be produced from other materials.

With reference to FIG. 2, support S formed by main body 3 and coating 2 is then separated from mould 4. By this means a main body 3 is obtained which is covered with a coating 2 which is sealed, and which comprises a reception imprint 10 which partially fits the outer shape of equipment 8.

After cleaning, support S can then directly hold an equipment 8 in place, supporting it optimally.

According to a preferred aspect of the invention, coating 2 can be self-coloured, to form a support S of the desired colour. In a preferred manner, outer surface SE of support S, which is located outside reception imprints 10, is painted a colour different to the initial colour of coating 2 to enable reception imprints 10 to be better distinguished. This enables it to be determined visually whether or not equipment 8 is present, as explained above.

Such a manufacturing method is particularly advantageous, since it enables a customised support S to be formed in only a few steps. Such a method is particularly suitable for small series.

To install an aeronautical engine an operator has a tool cart in which a two-coloured support S is placed. Due to its coating 2 made of elastomer, and in particular of polyurea, support S does not fragment, and has a longer lifetime. Coating 2 is also sealed and resistant to chemicals (kerosene, engine oil, etc.). Thus, if kerosene is inadvertently poured on to support S, the latter can be cleaned practically, in particular with acetone. The performance of support S is advantageously not impaired, since support S is not contaminated.

In addition, since coating 2 fits the shape of equipment 8 which is to be held in place, the latter is supported in a stable manner, which minimises any damage during transport in the event of impact or due to vibrations. As well as providing improved protection, such a reception imprint 10 enables foolproofing in support S.

Due to support S, reception imprints 10 which are empty can be identified rapidly, to prevent a tool being left inadvertently inside the engine. Advantageously, the risk of damage relating to the loss of tools during installation of an engine (FOD, "Foreign Object Damage") is reduced.

The invention has been shown for the tool support, but it is self-evident that it also applies to the support of all kinds of equipment, in particular aeronautical equipment of high added value. Such equipments are costly, and must be supported and handled with many precautions to prevent them being damaged.

The invention has been described for a carrying case, but it is self-evident that it applies to various storage means, in particular a flight case, whether or not stackable, a multi-tool set, a shuttle case, a tool chest, or similar.

The invention claimed is:

1. A method of manufacture a support for a piece of equipment, wherein the method comprises:
    a step of production of a mold defining at least one reception imprint, wherein a size and shape of the at least one reception imprint conforms to 40%-50% of a surface of a piece of equipment located therein, the mold being made from a digital model of the equipment produced by a computer-assisted design application or obtained by computer scanning of the piece of equipment;
    a step of liquid projection of a waterproof elastomer material into the mold to form at least one coating of the support, the waterproof elastomer comprising polyurea configured to contact a piece of equipment to be located in the support; and
    a step of injection of a non-depressible main body of the support onto the at least one coating after hardening of the waterproof elastomer material.

2. The method of claim 1, wherein the non-depressible main body comprises a polyurethane material.

3. The method of claim 1, wherein the non-depressible main body comprises a polyurethane foam.

4. The method of claim 1, wherein the main body comprises a first color and a surface of the at least one reception imprint comprises a second color that differs from the first color.

5. The method of claim 4, further comprising a second reception imprint having a surface with the second color.

6. The method of claim 5, wherein the support is located in a case comprising a body and a lid hinged to the body.

7. The method of claim 6, wherein the second color is a bright color.

8. The method of claim 7, wherein the polyurea comprises a blend of isocyanates.

9. A method of manufacture a support for a piece of equipment, wherein the method comprises:
    a step of obtaining a digital model of an equipment produced by a computer-assisted design application or by computer scanning of the equipment;
    a step of production of a mold using the digital model, the mold comprising a reception imprint, wherein a size and shape of the reception imprint conforms to at least a portion of a surface of an equipment to be located therein;
    a step of liquid projection of a waterproof elastomer material into the mold to form a coating inside the mold, the waterproof elastomer comprising polyurea; and
    a step of injection of a foam material into the mold to form a main body of the support after hardening of the waterproof elastomer material.

10. The method of claim 9, wherein the foam material is a polyurethane foam.

11. The method of claim 10, wherein the main body comprises a first color and a surface of the reception imprint comprises a second color that differs from the first color.

12. The method of claim 11, wherein the reception imprint is a first reception imprint and further comprising a second reception imprint having a surface with the second color.

13. The method of claim 12, wherein the second color is a bright color.

14. The method of claim 13, wherein the polyurea comprises a blend of isocyanates.

15. A method of manufacture a support for a piece of equipment, wherein the method comprises:
    a step of obtaining a positive mold, the mold comprising four side walls and a shaped central area representative of an equipment for which the support is sized to accommodate;
    a step of liquid projection of a waterproof elastomer material into the mold to form a coating inside the mold, the waterproof elastomer comprising polyurea; and
    a step of injection of a foam material into the mold to form a main body of the support after hardening of the waterproof elastomer material.

16. The method of claim 15, wherein the foam material is a polyurethane foam.

17. The method of claim 16, wherein the main body comprises a first color and a surface of the reception imprint comprises a second color that differs from the first color.

18. The method of claim 17, wherein the support is located in a case comprising a body and a lid hinged to the body.

19. The method of claim 18, wherein the reception imprint is a first reception imprint and further comprising a second reception imprint having a surface with the second color.

20. The method of claim 19, wherein the second color is a bright color.

* * * * *